United States Patent [19]

Holmes

[11] 4,171,012
[45] * Oct. 16, 1979

[54] LOCKING THREAD CONSTRUCTION

[76] Inventor: Horace D. Holmes, 28576 Green Willow, Farmington Hills, Mich. 48024

[*] Notice: The portion of the term of this patent subsequent to Feb. 28, 1995, has been disclaimed.

[21] Appl. No.: 851,759

[22] Filed: Nov. 15, 1977

Related U.S. Application Data

[63] Continuation-in-part of Ser. No. 770,411, Feb. 18, 1977, abandoned, which is a continuation of Ser. No. 635,217, Nov. 25, 1975, abandoned, which is a continuation-in-part of Ser. No. 620,566, Oct. 8, 1975, abandoned.

[51] Int. Cl.² ............................................. F16B 39/30
[52] U.S. Cl. .................................... 151/14 R; 85/46; 151/22
[58] Field of Search ................... 85/46, 47, 48, 32 T; 151/14 R, 22

[56] References Cited

U.S. PATENT DOCUMENTS

| | | | |
|---|---|---|---|
| 1,697,118 | 1/1929 | Hoke | 151/14 R |
| 1,798,604 | 3/1931 | Hoke | 151/14 R |
| 1,828,856 | 10/1931 | Bridges | 151/14 R |
| 2,091,788 | 8/1937 | McManus | 151/14 R |
| 2,215,770 | 9/1940 | Sheffield | 85/46 |

FOREIGN PATENT DOCUMENTS

| | | | |
|---|---|---|---|
| 335598 | 9/1930 | United Kingdom | 151/14 R |
| 337675 | 11/1930 | United Kingdom | 151/14 R |

Primary Examiner—Rodney H. Bonck
Attorney, Agent, or Firm—Krass & Young

[57] ABSTRACT

A locking thread design which may be incorporated in various types of male and female threaded elements, for example, a bolt and nut, or a bolt and casting, forging or similar member having a threaded bore therein. The thread design may be of the Standard, i.e., American or Unified Standard, or buttress type and is free running until a predetermined magnitude of loading is applied thereto, at which time the locking action of the thread occurs so as to prevent relative lateral movement between the nut and bolt and hence positively resist loosening thereof under vibration and similar adverse operating conditions. The locking thread may be embodied on either one or both of the threaded elements, and will operate effectively when the locking thread is operatively associated with threaded members having conventional threads thereon.

10 Claims, 13 Drawing Figures

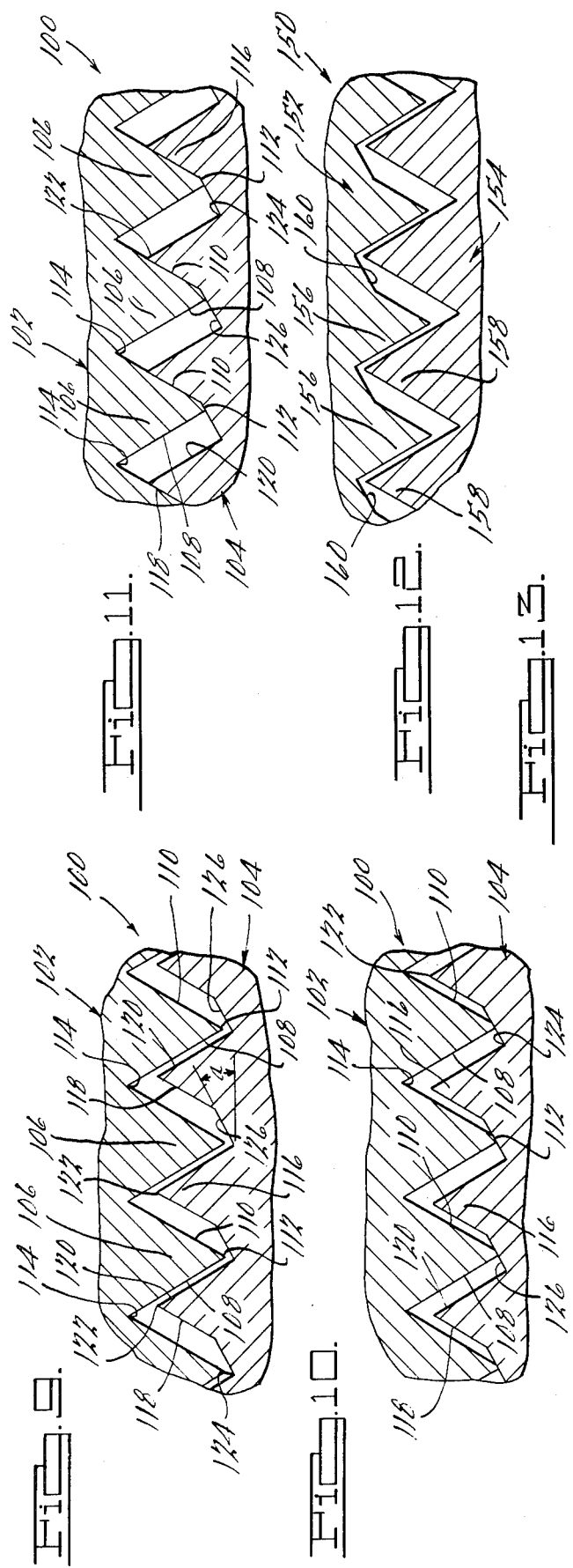
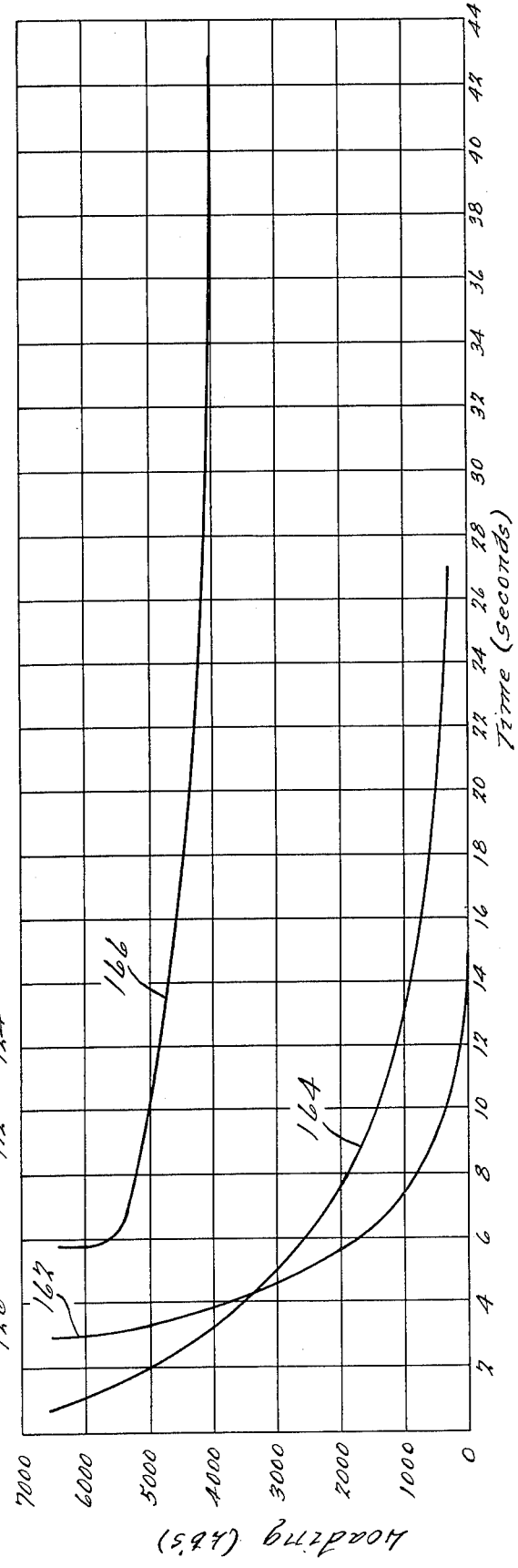

LOCKING THREAD CONSTRUCTION

RELATED APPLICATIONS

This is a continuation-in-part application of Ser. No. 770,411, filed Feb. 18, 1977, now abandoned, which is a continuation of Ser. No. 635,217, filed Nov. 25, 1975, now abandoned, which in turn is a continuation-in-part of Ser. No. 620,566, filed Oct. 8, 1975 and now abandoned.

BACKGROUND OF THE INVENTION

A search has disclosed various types of locking thread designs wherein a binding pressure is provided between the threads of male and female elements to produce a positive lock. Such prior art designs, for example, are shown in U.S. Pat. Nos. 1,657,244; 1,697,118; 1,798,604; 1,817,295 and 1,828,856 and in French Pat. No. 40,199 of 1932. These prior art locking thread designs are believed to operate satisfactorily in theory, but from a practical and commercial standpoint, are unacceptable due to the tolerance limitations under which modern thread forming equipment must operate. The locking thread design of the present invention on the other hand, may be readily formed with conveniently available equipment and in accordance with current tolerance limitations. More importantly, the thread forms of the present invention are not intended to lock by binding action, as is the case with the thread forms of the aforementioned prior art patents but instead, locking action is achieved by preventing relative motion between the mating parts and results in a locking action between the threaded elements that appears to be at least as good as, if not superior to the locking performance of the aforesaid prior art locking thread designs.

SUMMARY OF THE INVENTION

The locking thread form of the present invention is illustrated, by way of example, as embodied on a nut and bolt which are employed to clamp a pair of elements in tight secured engagement with each other. The subject thread form may be operatively associated with both Standard and buttress-type threads and utilizes a flat area or ramp at the thread root of either or both of the bolt and nut threads. In the case where the locking thread form is used on both elements having buttress-type threads, the ramp at the thread root on the bolt is disposed at an angle of approximately 30° from the bolt's axis, while the ramp at the thread root of the nut is disposed at an angle of approximately 22½° to the nut axis. The purpose of the angles at the thread roots is to allow the threads to be manufactured to normal commercial tolerances and still always make contact with the crown of the mating thread and thereby prevent lateral movement between the threaded members and thus prevent loosening under vibration or other adverse conditions. In the case where the ramp is utilized on one of a pair of elements provided with Standard-type threads, the angle of the ramp may be varied within limits in accordance with the class fit, size threaded elements and acceptable tolerance ranges to provide for optimum locking ability with commercially available equipment and technology. It is to be noted that the aforesaid angles for buttress-type threads are given by way of example and apply particularly when the nut (female element) is fabricated of a relatively softer material than the bolt or male element, and that the angles may be the same or relatively larger or smaller on the male and female elements depending upon the relative degree of hardness of the materials from which these elements are formed.

The thread design of the present invention is free running under non-loaded or lightly loaded conditions; however, at such time as the degree of loading reaches a predetermined magnitude, the thread crown or crowns move into contact with the ramp or ramps of the opposing threaded element.

BRIEF DESCRIPTION OF THE DRAWINGS

FIG. 9 is an enlarged fragmentary cross-sectional view of an alternate construction of the locking thread form of the present invention, as shown in a free-running condition;

FIG. 10 is an enlarged fragmentary cross-sectional view of the thread form shown in FIG. 9 after a partial loading has been applied thereto;

FIG. 11 is an enlarged fragmentary cross-sectional view of the thread form shown in FIGS. 9 and 10 after substantially complete loading has been applied thereto;

FIG. 12 is an enlarged fragmentary cross-sectional view, similar to FIG. 9 of still another alternate embodiment of the present invention; and FIG. 13 is a graphic representation similar to FIG. 8 and illustrates the comparative locking characteristics of the locking thread form shown in FIGS. 9-11.

DESCRIPTION OF THE PREFERRED EMBODIMENT

Figure 1:
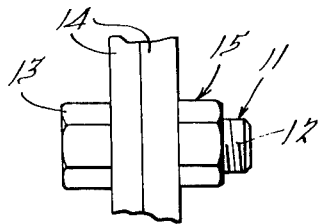
FIG. 1 is a view in elevation of a bolt clamping two elements together on a thread embodying features of the present invention.
Figure 2:
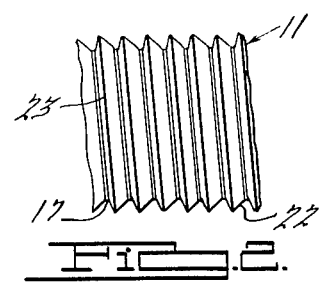
FIG. 2 is an enlarged broken view of the bolt thread illustrated in FIG. 1.

FIGS. 1-8 illustrate embodiments of the present invention wherein the locking thread form is associated with buttress-type threads. In particular, a bolt or male threaded element 11 is shown as comprising a shank portion at one end thereof which is formed with a thread 12, and with an enlarged head 13 being provided at the opposite end from the thread 12. The bolt, as illustrated in FIG. 1, extends through a pair of elements 14 which are to be clamped together by a nut or female threaded element 15 having an internal thread 10 which is normally freely running on the thread 12 of the bolt. The bolt 11 is preferably, although not necessarily, constructed from a hardenable steel, such as 1335, 1441 or 1340, while the nut 15 is constructed from a relatively softer or more deformable steel than the bolt 11, such as 1008 or 1010. It is to be understood that the bolt could also be constructed from a soft steel but is preferably constructed of a hardenable steel. As is conventional with threads of the buttress type, threads 10, 12 have one flank thereof at a substantial angle while the opposing flanks thereof have very small angle relative to the axis of the bolt or nut. As illustrated in FIGS. 2–5 inclusive, the thread of both the bolt 11 and nut 15 has the root flattened in a manner to provide a flat surface or ramp which slopes relative to the thread axis; the flat 16 at the root of the nut 15 is disposed at an angle of approximately 22½° relative to the thread axis, while the flat 17 at the root of the bolt thread 12 is disposed at an angle of approximately 30° from the axis of the thread.

It is to be noted that the aforesaid angles will vary with the degree of hardness of the material from which the bolt 11 and nut 15 are fabricated, and that when these elements are fabricated so as to be of similar or identical hardness, the angles of the flats or ramps 16 and 17 are preferably equal or approximately equal.

Figure 3:
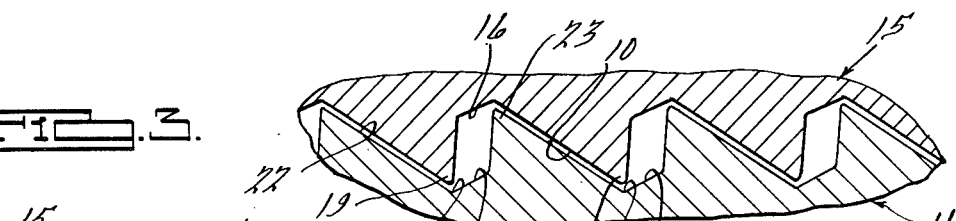
FIG. 3 is an enlarged broken sectional view of the thread of the nut and bolt when in free-running relation to each other.
Figure 4:
FIG. 4 is a view of the structure illustrated in FIG. 3 after the bolt has clamped the two elements illustrated in FIG. 1, with a minimum of holding force.
Figure 5:
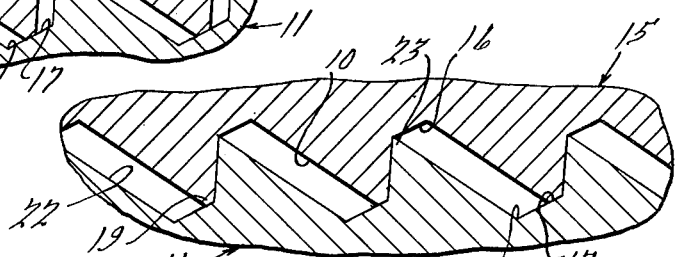
FIG. 5 is a view of the structure illustrated in FIG. 4, when a substantial pressure has been applied on the nut to cause the thread of the nut to advance to the right until thread engagement occurs.

When the nut 15 is in the position illustrated in FIG. 3 with the crown 19 of its thread 10 disposed adjacent to the corner 21 of the bolt 11 between the flat surface 17 and the sloping face 22, the nut 15 is free running on the thread 12 and is freely rotatable toward the left until the nut 15 strikes the adjacent element 14, whereupon the continued rotation of the nut 15 will cause the crowns 19 and flat 16 to move to the right engaging the flat sloping surface 17 and crown 23, respectively, and causing the softer metal of the crown 19 to deform. In FIG. 4, the crown 23 is illustrated as contacting the sloping flat 16 of the nut 15, as would occur when an approximately 50 foot-pound force is exerted on a one-half inch bolt, thereby providing a substantial degree of contact between the threads which locks the nut 15 in position along the bolt shank. When an increased torsional force is applied to the nut 15, an even greater degree of contact will occur between the ramps 16, 17 and the crowns 19, 23 until the faces of the nut thread engages the faces of the bolt thread, as shown in FIG. 5, which would occur, for example, when a one-half inch bolt is subjected to a 90 foot-pound load. This provides an even greater degree of contact between the crowns 19 and 23 and the flat sloping surfaces 17 and 16, and under these conditions, any relative lateral movement between the nut 15 and bolt 11 is positively prevented so as to assure against loosening thereof, which locked condition will exist until such time as a positive force is applied to unscrew the nut thread 10 from the thread 12 of the bolt 11 and thereby cause the respective threads to reach the position illustrated in FIG. 3, whereupon the nut 15 is again free running toward the end of the bolt thread 12.

Figure 6:
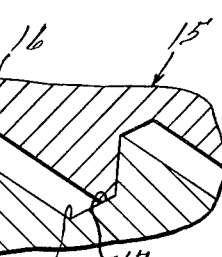
FIG. 6 is a view of structure, similar to that illustrated in FIG. 3, with only the bolt having the root of the thread provided with a sloping surface.

Referring to FIG. 6, the bolt 11 is the same as the bolt above described with regard to FIGS. 1–5 while the nut 25 has no flat areas 16 in the thread root thereof. As a result, the crown 19 of the nut will contact the flat sloping surface 17 at the root of the bolt to provide the locking of the nut on the bolt when sufficient pressure has been applied to the nut after the elements 14 have been clamped together.

Figure 7:
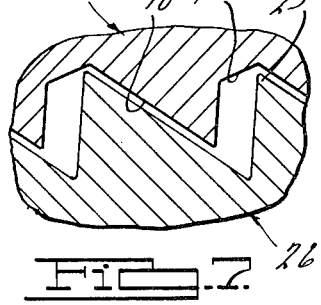
FIG. 7 is a view of structure, similar to that illustrated in FIG. 6, with only the nut having the root of its thread provided with a flat surface.

A similar result is obtained when the relationship of the threads is that illustrated in FIG. 7. In this arrangement, the thread 10 of the nut 15 has the flat 16 thereon while bolt 26 has no flat in the root area. When the nut 15 is subjected to a predetermined degree of axial loading, such as when it is being tightened against the element 14, further rotation of the nut 15 will cause the crown 23 of the bolt thread to contact flat surface 16 of the nut thread 10, thereby producing distortion or penetration of the ramp 16 of the soft nut metal to a degree commensurate with the amount of pressure (torque) which is applied to clamp the element 14. When a substantial pressure is applied, the faces of the nut thread will advance into engagement with the facing surfaces of the thread of the bolt 26, as described above. In any of the examples herein illustrated, it will be noted that the engagement of the crowns of one or both threads with the sloping ramp or ramps at the roots of the opposing threads will produce the deformation or distortion of the soft metal of the nut or both the nut and bolt, with the result that no lateral movement between the nut and bolt will occur, which in turn assures against loosening of the bolt and nut after assembly thereof.

Figure 8:
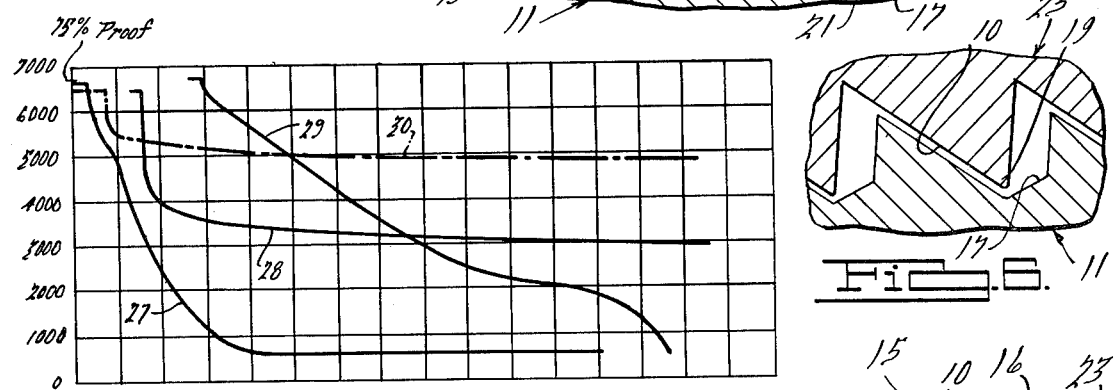
FIG. 8 is a view of a chart showing the substantial holding force provided by the thread structure herein illustrated and described.

The chart or graph of FIG. 8 shows the result of the same test made on four different nut and bolt combinations on a Junkers testing machine which vibrates the tightened nut and bolt supported thereon. The first graph line 27 represents a test performed on a Standard-type of bolt and nut having a 7/16 inch diameter after it was drawn up to approximately 7,000 pounds axial force. The shaking of this bolt and nut rapidly loosened the nut and the holding force quickly decreased to substantially below 1,000 pounds. Each square represents approximately two seconds of time so that this test occurred in practically ten seconds. The graph line 28 represents a test run on a 7/16 inch nut and bolt of the present invention in which it will be noted that under a clamping force of 6,500 pounds the vibration caused an initial Brinelling of the nut and seating of the thread form (although no rotation of the nut), but which thereafter maintained a clamping force of between approximately three and four thousand pounds. The third graph line 29 was the result of a test on a 7/16 inch prior art-type lock nut and associated bolt, the lock nut being triangular in this particular test, and as illustrated, a rapid drop from the 6,500 pounds applied force occurred on to the bottom of the chart. Graph line 30 discloses a subsequent or second test of the identical nut and bolt tested in connection with the graph line 28 and illustrates the fact that the superior locking characteristics of the present invention are not lessened even during reuse of the nut and bolt. The reason that the bolt and nut lessened to a greater degree during the original test depicted by line 28, as compared to the "reuse" test depicted by line 30, is believed to be attributed to a certain amount of thread seating and a protective coating on the nut and bolt elements which caused an artificially low reading of the original test data.

FIGS. 9–12 illustrate alternate embodiments of the locking thread form of the present invention wherein the thread form is operatively associated with Standard, i.e., American or Unified, type threads, and wherein the thread form may be provided on either of two threaded elements and operatively associated with the other threaded element which may be of conventional construction. In particular, FIGS. 9–11 illustrate a locking thread form 100 shown in association with a pair of threaded elements 102 and 104. By way of example, the threaded element 102 may consist of a nut, while the threaded element 104 may consist of a bolt. The threaded element 102 is formed with a Standard thread form 106, each thread of which comprises converging flanks 108, 110 defining a crest 112 and having a root area 114. Similarly, the threaded element 104 is formed with a Standard thread form 116, each thread of which comprises flanks 118, 120, a crest 122 and a root area 124.

In accordance with the principles of the present invention, each of the root areas on the threaded member 104 is formed with an inclined ramp 126 which is analogous to the aforedescribed ramps 16. The ramps 126 are oriented at an angle with respect to the axis of the threaded elements 102, 104, which angle is selected so as to assure positive engagement of the crest 112 therewith upon application of loading to the elements 102, 104 and consistent with modern manufacturing tolerances.

More particularly, it has been found that optimum locking ability of the elements 102, 104 can be achieved without sacrificing any strip strength thereof by making the axial length of the ramps 126 equal to approximately 0.020 inches and designing the angle thereof relative to the axis of the elements 102, 104 such that approximately one-half the maximum tolerance between the elements 102 and 104, plus a safety factor of approximately 0.002, is taken up in the aforesaid axial distance of 0.020 inches.

By way of example, for a Standard ⅜ inch nut and bolt having 16 threads per inch, the maximum acceptable diameter limit is 0.3750 inches and the minimum acceptable diameter limit is 0.3595 inches. Taking the difference between these limits, i.e., 0.3750−0.3595 results in 0.0155 which, when added to the aforementioned safety factor of 0.002 (which accommodates for tool wear, etc.) equals 0.0175, and one-half of 0.0175 equals 0.0087. The angle a whose tangent equals 0.0087÷0.020 is 23.5°. Therefore, the optimum angle at which the ramps 126 should be located relative to axis of the elements 102, 104 where it is desired to take up approximately one-half the total maximum tolerance between the aforementioned size and class threaded elements in a distance of 0.020 is 23.5°. It will be appreciated, of course, that such angle a will vary in accordance with changes in either the safety factor, class threads, number of threads per inch, or diameter of threaded elements. The following chart sets forth acceptable angles of the ramps 126 for the respective size threaded elements, thread class and number of threads per inch, as calculated in accordance with the above example:

| STANDARD SERIES SCREW THREADS | | | | |
|---|---|---|---|---|
| Size Threaded Elements | Threads Per Inch | CLASS 1 Angle Required | CLASS 2 Angle Required | CLASS 3 Angle Required |
| 3/8 | 16 | 23.5 ± .5° | 17.6 ± .5° | 15.9 ± .5° |
| 7/16 | 14 | 25.2 ± .5° | 18.9 ± .5° | 17.0 ± .5° |
| 1/2 | 13 | 26.3 ± .5° | 19.7 ±.0 .5° | 17.8 ± .5° |
| 9/16 | 12 | 27.4 ± .5° | 20.5 ± .5° | 18.5 ± .5° |
| 5/8 | 11 | 28.5 ± .5° | 21.4 ± .5° | 19.4 ± .5° |
| 11/16 | 12 | — | 20.5 ± .5° | 18.5 ± .5° |
| 3/4 | 10 | 30.1 ± .5° | 22.6 ± .5° | 20.4 ± .5° |

By selecting the angles of the ramps 126 in accordance with the above, lateral movement between the elements 102, 104 upon applying preselected loading thereto is effectively precluded, thereby assuring that the elements 102, 104 will remain in their respective locked positions once they are moved from their free-running relation shown in FIG. 9 to either the partially loaded position shown in FIG. 10 or the completely loaded position shown in FIG. 11. While the angles given in the table above are preferred for the indicated applications, it has been found that angles up to and in excess of 35° are effective in many combinations. It is believed that the practical upper limit is about 45°.

FIG. 12 illustrates a slightly modified embodiment of the thread form shown in FIGS. 9–11 wherein the inclined ramps are located on the female element (nut) instead of the male element, as is the case with the thread form shown in FIGS. 9–11. In particular, the locking thread form shown in FIG. 13 is generally designated by the numeral 150 and is shown in operative association with threaded elements 152 and 154 which may consist of a nut and bolt, respectively. The elements 152, 154 are provided with Standard threads 156 and 158, respectively, with the root area of the thread 156 being formed with inclined ramps 160, as hereinabove described. The angles at which the ramps 160 are inclined relative to the axis of the elements 152, 154 are selected in accordance with the above example of the angle of the ramp 126 so as to minimize relative lateral movement between the elements 152, 154 and hence provide for optimum locking ability within the range of acceptable commercial tolerances. Thus, it will be seen that the principles of the present invention are applicable when either the male or female member is provided with the locking thread form, and that the other member need not have any special form other than the Standard form, thereby providing for universality of application. The embodiments shown in FIGS. 3–7 may be considered to be preferable to the embodiments shown in FIGS. 9–12 insofar as strip strength is concerned, although the strip strength of Standard thread forms can be improved by slightly increasing the length of the threads.

FIG. 13 is a graphic illustration similar to FIG. 8 and depicts the performance of the locking thread form shown in FIG. 12 as compared to conventional thread designs. The illustration shown in FIG. 13 represents tests on a 7/16 inch grade five bolt having a Standard thread form with three different nuts, as performed on the Junkers testing machine hereinabove described. The curve 162 represents a test performed on a Standard nut and bolt that had no type of locking means, and it will be noted that the effective locking ability drops to nearly zero in less than 14 seconds. The curve represented by the numeral 164 represents the results of a test of a Standard thread form on a bolt and associated with a conventional lock nut of the crimp or deformed type. This particular locking arrangement, while superior to the arrangement shown by the curve 162, also loses its locking ability rapidly, with the result that the locking ability thereof is effectively nonexistent after approximately 26 seconds. Graph line 166 represents a test run with the thread form illustrated in FIG. 12 wherein the bolt has a Standard thread form and the nut is provided with the aforementioned ramps 126. It will be readily apparent that the locking performance of this thread form is highly superior to those associated with the curves 162 and 164 and that the locking ability of the thread form of the present invention remains at a highly acceptable level for the duration of the testing procedure.

While it will be apparent that the embodiments illustrated herein are well calculated to fulfill the objects above stated, it will be appreciated that the present invention is susceptible to modification, variation and change without departing from the proper scope or fair meaning of the subjoined claims.

The embodiments of the invention in which an exclusive property or privilege is claimed are defined as follows:

1. A fastener combination comprising a threaded male element and a threaded female element adapted to receive the male element in threaded engagement therewith;

each of the male and female threaded elements having a thread form thereon defined by leading and trailing helical flanks which intersect to define a crown, each flank lying at an angle relative to the common longitudinal thread axis of the fastener combination;

the female element including a truncated root adjacent the major diameter thereof, said truncated root defining a helical flat extending between the trailing flank and the adjacent leading flank which faces said trailing flank, and said flat, throughout its axial extent lying at an angle between about 15° and 45° relative to the thread axis which is substantially less than the angle of the male element flank which tends to converge on said flat under axial tension load, said flat angled radially outward from said trailing to said adjacent leading flank;

whereby axial tension loading of the combination tends to displace the crown of the male thread into contact with the flat to prevent movement between the elements transverse to said axis and lock said elements together.

2. A fastener combination as defined in claim 1 wherein the angles of the respective flanks are unequal such that the thread forms are asymmetric.

3. A fastener combination as defined in claim 1 wherein the male element is a bolt having a gripping head, and the female element is a nut having wrenching surfaces.

4. A fastener combination comprising a threaded male element and a threaded female element adapted to receive the male element in threaded enagement therewith;

each of the male and female threaded elements having a thread form thereon defined by leading and trailing helical flanks which intersect to define a crown, each flank lying at an angle relative to the common longitudinal thread axis of the fastener combination;

one of the elements including a truncated root defining a helical flat extending between the trailing flank and the adjacent leading flank which faces said trailing flank, and said flat, throughout its axial extent, lying at an angle between about 15° and 45° relative to the thread axis which is substantially less than the angle of the other element flank which tends to converge on said flat under axial tension load, said flat angled radially outward from said trailing to said adjacent leading flank;

whereby axial tension loading of the combination tends to displace the crown of said other thread into contact with the flat to prevent movement between the elements, transverse to said axis, and lock said elements together.

5. A fastener combination as defined in claim 4 wherein the angles of the respective flanks are unequal such that the thread forms are asymmetric.

6. A fastener combination as defined in claim 4 wherein the male element is a bolt having a gripping head, and the female element is a nut having wrenching surfaces.

7. For use in a fastener combination comprising a threaded male element having a thread form thereon defined by leading and trailing helical flanks which intersect to define a crown, each flank lying at an angle relative to the common longitudinal thread axis of the fastener combination;

a female threaded element having an external bearing surface for engagement with a work piece and an internal thread form defined by leading and trailing helical, intersecting flanks each of which lies at an angle relative to the thread axis thereof;

the female element including a truncated root adjacent the major diameter thereof, said truncated root defining a helical flat extending between the trailing flank and the adjacent leading flank which faces said trailing flank, and said flat, throughout its axial extent, lying at an angle between about 15° and 45° relative to the thread axis which is substantially less than the angle of the male element flank which tends to converge on said flat under axial tension load, said flat angled radially outward from said trailing to said adjacent leading flank;

whereby, when in the combination, axial tension loading tends to displace the crown of a male thread into contact with the flat to prevent movement between the elements transverse to said axis and lock said elements together.

8. A fastener combination as defined in claim 7 wherein the angles of the respective flanks are unequal such that the thread forms are asymmetric.

9. A fastener combination as defined in claim 7 wherein the male element is a bolt having a gripping head, and the female element is a nut having wrenching surfaces.

10. For use in a fastener combination comprising a threaded female element having a thread form thereon defined by leading and trailing helical flanks which intersect to define a crown, each flank lying at an angle relative to the common longitudinal thread axis of the fastener combination:

a male threaded element having an external bearing surface for engagement with a workpiece and an external thread form defined by leading and trailing helical intersecting flanks each of which lies at an angle relative to the thread axis thereof;

the male element including a truncated root adjacent the minor diameter thereof, said truncated root defining a helical flat extending between the trailing flank and the adjacent leading flank which faces said trailing flank and said flat, throughout its axial extent, lying at an angle between about 15° and 45° relative to the thread axis which is substantially less than the angle of the female element flank which tends to converge on said flat under axial tension load, said flat angled radially outward from said leading to said adjacent trailing flank;

whereby when in the combination axial tension loading tends to displace the crown of a female thread into contact with the flat to prevent movement between the elements transverse to said axis and lock said elements together.

* * * * *